United States Patent [19]

Weisbord et al.

[11] 4,433,260
[45] Feb. 21, 1984

[54] HYSTERESIS SYNCHRONOUS MOTOR UTILIZING POLARIZED ROTOR

[75] Inventors: Leon E. Weisbord, Secaucus; Francis W. Wessbecher, Morris Plains, both of N.J.

[73] Assignee: The Singer Company, Little Falls, N.J.

[21] Appl. No.: 433,714

[22] Filed: Oct. 12, 1982

[51] Int. Cl.³ .......................................... H02K 21/12
[52] U.S. Cl. .................................. 310/156; 310/261; 310/DIG. 2
[58] Field of Search ................. 310/DIG. 2, 261, 103, 310/156, 104, 162, 105, 163, 106, 164, 152, 67, 216, 152, 264, 265, 266; 74/5.7; 324/146

[56] References Cited

U.S. PATENT DOCUMENTS

| | | | |
|---|---|---|---|
| 2,547,599 | 4/1951 | Roters | 310/DIG. 2 |
| 2,784,331 | 3/1957 | Rodemann | 310/DIG. 2 |
| 2,810,085 | 10/1957 | Akeley | 310/DIG. 2 |
| 3,068,373 | 12/1962 | Bekey | 310/DIG. 2 |
| 3,164,735 | 1/1965 | Lichowsky | 310/DIG. 2 |
| 3,181,018 | 4/1965 | Shafranek | 310/156 |
| 3,334,254 | 8/1967 | Kober | 310/156 |
| 3,411,059 | 11/1968 | Kaiwa | 310/156 |
| 3,956,650 | 5/1976 | Field | 310/156 |
| 4,347,457 | 8/1982 | Sakamoto | 310/156 |

FOREIGN PATENT DOCUMENTS

| | | | |
|---|---|---|---|
| 960944 | 6/1964 | United Kingdom | 310/DIG. 2 |
| 716117 | 2/1980 | U.S.S.R. | 310/DIG. 2 |

Primary Examiner—R. Skudy
Attorney, Agent, or Firm—Morris Liss; T. W. Kennedy

[57] ABSTRACT

A hysteresis synchronous motor in which a rotor includes arcuate permanent magnets mounted adjacent to the hysteresis ring material. Permanent magnetic poles are induced in the ring material by the rotating electromagnetic stator field. After start-up, the rotor remains synchronized with the rotating field due to the mutual attraction of opposite magnetic poles.

7 Claims, 8 Drawing Figures

HYSTERESIS SYNCHRONOUS MOTOR UTILIZING POLARIZED ROTOR

FIELD OF THE INVENTION

The present invention relates to synchronous motors and more particularly to a hysteresis synchronous motor utilizing permanent magnets for establishing a polarized rotor.

BRIEF DESCRIPTION OF THE PRIOR ART

In a number of applications, it is important that a motor rotor lock in at a fixed position, relative to the rotating electromagnetic field of the stator. U.S. Pat. No. 3,068,373 to Bekey accomplishes this by utilizing radially oriented permanent magnets in the rotor structure. However, in this patent, the radially oriented magnets cover a wide angle at the poles and flux lines are distributed across this wide angle thereby diminishing the intensity of the flux at a particular pole so that sharp points of field intensity at the poles cannot be recognized. As a result, the lock-in angular range of the Bekey motor is disadvantageously large.

Further, the Bekey motor has magnets that are radially displaced by a relatively large distance from the stator. This is due to the location of the hysteresis ring material which is interposed between the magnet and the stator. Because of this construction, the magnetic attraction between the stator field and the permanent magnet field is quite diminished. This results in decreased lock-in capability.

BRIEF DESCRIPTION OF THE PRESENT INVENTION

The present invention utilizes rotor permanent magnets which are arcuate in shape and may be generally considered as having a tangential orientation as opposed to the radial orientation of Bekey. The polarized rotor design of the present invention demonstrates very sharp and intense flux peaks at the poles as opposed to wide and small peaks of the Bekey design. Because of the sharpness and height of the magnetic flux peaks, demonstrated by the present rotor, the lock-in angular range is small and precise. Tests of the invention demonstrate that this lock-in is less than 5 degrees from run to run.

Unlike Bekey, the hysteresis ring material in the present invention is placed axially on either side of the permanent magnet material. This results in close proximity of the permanent magnet to the confronting stator. As a result, magnetic attraction between the stator field and the permanent magnet field is maximized.

An important application of the present invention is gyroscope motors which require a repeatable and precise lock-in angle. This is obtained by the present invention but not with the discussed prior art.

In most gyro applications, no effort is made to fix the phase angle. The motor rotor is allowed to lock-in at any arbitrary position and the resulting bias error is accepted as one of the uncertainties in the accuracy of the gyro. Certain prior art gyro motor devices are capable of demonstrating a fairly constant lock-in position. These devices consist of a special motor excitation supply along with a position reference signal obtained from a transducer on the motor rotor in such a manner that the phase angle of the excitation supply is caused to advance or retard until a fixed angle is obtained between the position reference and the motor excitation angle. This is often referred to as a phase-lock excitation. In addition to special motor excitation supply and a transducer generated position reference signal, this type of prior art approach makes separate motor excitation supplies necessary for each motor to be operated.

Unlike prior art gyro motors, utilization of the present invention insures that lock-in always occurs at the same position or the next similar pole of the permanent magnet assembly relative to the motor stator. Further, no external electronic circuitry is necessary to obtain lock-in. Still further, several motors can be operated from the same motor excitation supply. As a result, the present invention may be manufactured more inexpensively and far more reliably than the prior art devices.

The above-mentioned objects and advantages of the present invention will be more clearly understood when considered in conjunction with the accompanying drawings, in which:

DETAILED DESCRIPTION OF THE INVENTION

The primary purpose of the invention is to provide a polarized rotor for a hysteresis synchronous motor, having a conventional stator adapted to provide a rotating electromagnetic field, wherein rotor position, when locked to the rotating electromagnetic field of the stator, is in a fixed relative orientation therewith. Moreover, this fixed orientation will be the same, relative to the rotating electromagnetic field such time the motor is turned on. This fixed phase relationship is constant except for a redundancy equal to 360 degrees divided by half the number of poles in the motor. That is:

$$\text{Redundancy} = (2/n) \times 360°$$

where n = number of poles.

One of the main applications of this invention is in the area of gyroscope motors where it has been found that there is a gyro bias non-repeatability error associated with the turn-on and subsequent lock-in position of the motor relative to the rotating electromagnetic field. This error can be eliminated or drastically reduced by maintaining a constant lock-in position at every turn-on. For this particular application, the redundancy mentioned above is not a deterrent to the use of the invention because the aforementioned bias non-repeatability error usually repeats itself in the same manner as the redundancy. For instance, in the case of a four-pole motor, the error associated with the lock-in position repeats itself every 180 degrees and, to a lesser extent, every 90 degrees. That is, the turn-on bias level for a four-pole motor can be expressed as:

$$\epsilon = A \sin 2\phi + B \sin 4\phi \text{(for a 4-pole motor)}$$

Inasmuch as, $$\sin 2\phi = \sin 2(\phi + 180°)$$

and, $$\sin 4\phi = \sin 4(\phi + 180°).$$

The turn-on bias is the same whether the motor locks in at the position $\phi$ or the position $(\phi + 180°)$.

With a conventional hysteresis motor, the lock-in position can be any angle, $\phi$, between 0 and 360 degrees. On the other hand, the use of the present invention reduces the lock-in position to only two fixed positions, $\phi$ and $(\phi + 180°)$. (For instance, 43° and 223°). Referring back to the expression for the bias level, it can be seen that the bias level will be constant when the present invention is used.

Figure 1:
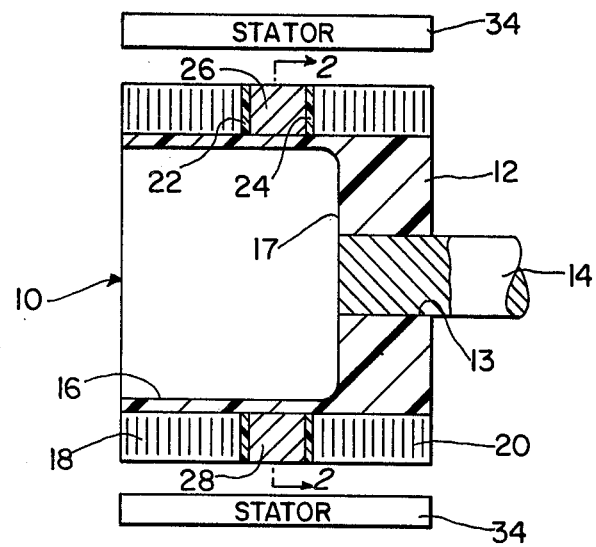
FIG. 1 is a cross sectional view of the rotor in accordance with the present invention.

Referring to the figures and more particularly FIG. 1, reference numeral 10 generally indicates a rotor construction in accordance with a first embodiment of the present invention. A hub 12, fabricated from a non-metallic material, has an axially formed passageway 13 formed therein for receiving a motor shaft 14. The hub 12 has a bore section 16 formed therein which steps down to the passageway 13 along annular shoulder 17. The hub is a mechanical structure for supporting the rotor components to be described as well as being received by a jig during assembly of the rotor. A first hysteresis ring 18 is coaxially located along the outer periphery of hub 12, the ring and the hub having their illustrated left edges coplanar with one another. The ring is fabricated from a series of laminations of such material as cobalt steel, P-6 laminations or other commercially utilized hysteresis materials. A second hysteresis ring 20, similar to the first, is likewise mounted to the outer periphery of hub 12. The invention is similarly applicable for rings made of solid hysteresis material. The rings are axially spaced from each other while the illustrated right edge of ring 20 is coplanar with the right edge of hub 12. Two annular non-magnetic spacers 22 and 24 are positioned along the periphery of hub 12 and in coaxial spaced relationship with hysteresis rings 18 and 20. Arcuate permanent magnets 26, 28, 30 and 32 are mounted along the periphery of hub 12 and are coaxial with the hysteresis rings 18, 20 and spacers 22 and 24. The non-magnetic spacers separate the magnets from the hysteresis laminations of rings 18 and 20 thus limiting the magnetic shunting effect of the laminations.

Reference numeral 34 schematically illustrates a conventional stator positioned in coaxial relationship with shaft 14, the stator being in direct confronting relationship with the radially outward periphery of the magnets, and being adapted to provide a rotating electromagnetic field.

Figure 2:
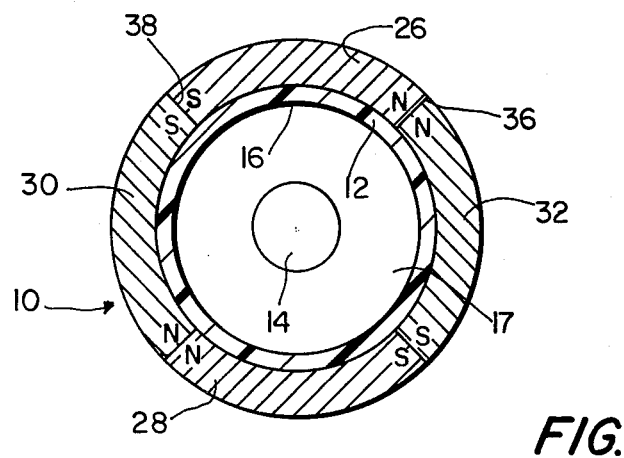
FIG. 2 is a sectional view of the rotor taken along a section line 2—2 indicating a four-pole version of the rotor.

FIG. 2 illustrates the disposition of similar magnetic poles at the interface between adjacent magnets. Thus, interface 36 separates two confronting north poles while interface 38 separates two confronting south poles. In effect, the rotor illustrated in FIG. 2 is a four-pole polarized rotor.

In operation of a conventional hysteresis synchronous motor, permanent magnetic poles are induced in the hysteresis ring material by the rotating electro-magnetic field of the motor stator. These poles can be induced at any position on the circumference of the hysteresis ring. After the poles are induced, the rotor remains in synchronism with the rotating electro-magnetic field by means of the mutual attraction of opposite magnetic poles.

In the case of the present invention, by utilizing a polarized rotor, the lock-in position is determined by the position of the permanent magnets 26, 28, 30 and 32. As the rotor approaches the rotational speed of the rotating electro-magnetic field from stator 34, the permanent magnets will be attracted to the opposite poles and lock-in will occur. At such time, additional poles will be induced in the hysteresis rings 18 and 20 and from that point on conventional hysteresis operation occurs.

Figure 3:
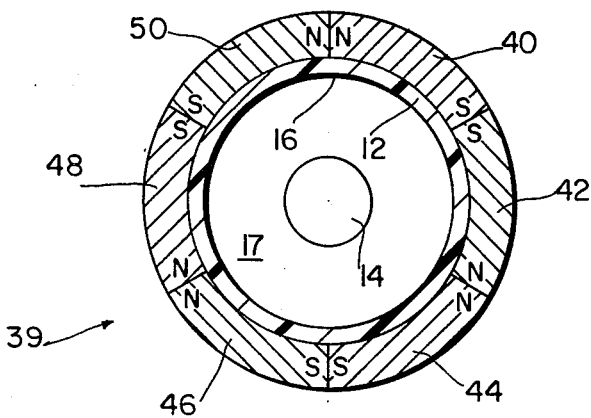
FIG. 3 is a sectional view similar to that of FIG. 2 but indicating a six-pole version of the rotor.

The utilization of a four-pole motor, such as illustrated in FIG. 2 is merely one example of how the present invention may be built. A similar configuration can be built for two, six, eight or other number of poles. FIG. 3 illustrates a rotor generally indicated by reference numeral 39 which includes six poles. The structure is achieved by employing six arcuate permanent magnets 40, 42, 44, 46, 48 and 50 in structural relationship to other rotor components as described in connection with FIG. 2.

Figure 6:
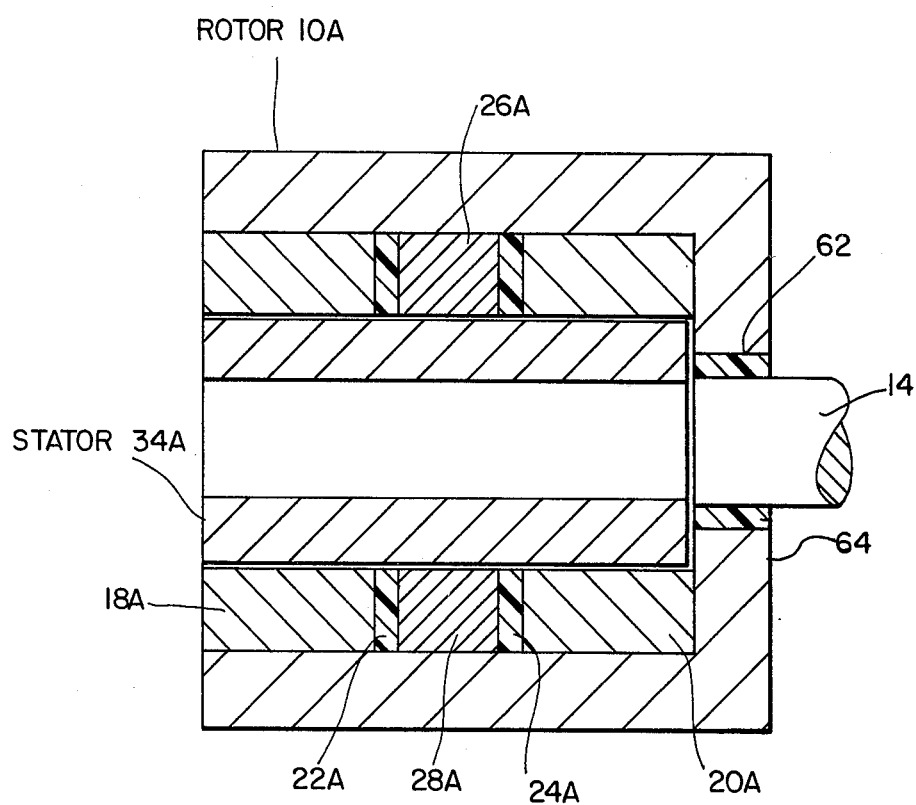
FIG. 6 is an alternate embodiment of the invention.

FIG. 6 illustrates an alternate embodiment of the present invention wherein those components identical to those previously discussed in connection with FIG. 1 are indicated by identical reference numerals. In the embodiment shown in FIG. 6, the rotor 10A is positioned at the outer diameter of the constructions while the stator 34A is located at the inner diameter of the structure. In the embodiment of FIG. 6, rings 18A and 20A are illustrated as being fabricated from solid hysteresis material although laminations as previously discussed may be used. The rings are appropriately attached to the inner cylindrical wall of rotor 10A remaining in coaxial relation with shaft 14. As in the first discussed embodiment of FIG. 1, magnets 26A and 28A are likewise located in coaxial relation with the shaft 14 while coplanar spacers 22A and 24A are likewise positioned along the interior cylindrical wall of rotor 10A. The spacers are non-magnetic and as in the case of the first embodiment they separate the magnets from the hysteresis material of rings 18A and 20A thus limiting the magnetic shunting effect of the hysteresis material.

With the inverse relationship between rotor and stator, as compared with the embodiment of FIG. 1, a non-metallic sleeve 64 is attached between shaft 14 and a bore 62 formed along the axis of rotor 10A. With the alternate embodiment of FIG. 6 operational, the discussed advantages of the invention may be realized.

Figure 4A:
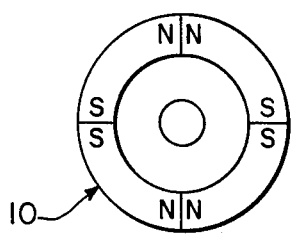
FIGS. 4A and 4B are diagrammatic plan views of the present rotor and a prior art rotor, respectively.
Figure 5A:
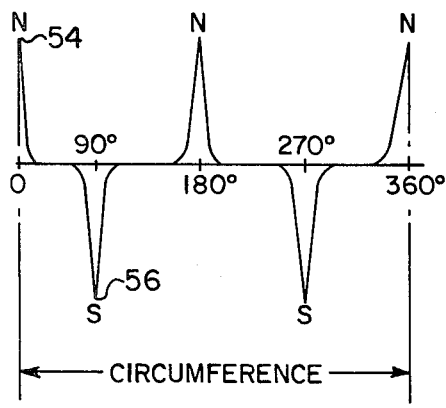
FIGS. 5A and 5B are flux plots for the rotors of FIGS. 4A and 4B, respectively.

FIG. 4A is a diagrammatic view of a polarized rotor 10 in accordance with the present invention and discussed in detail in connection with FIG. 2. A corresponding flux diagram of this rotor as a function of rotor circumference position is plotted in FIG. 5A. As will be noted, the present rotor achieves large and sharp flux peaks such as at 54 and 56 due to the manner in which the magnetic flux is forced to flow outwardly by mutually opposing poles of the magnets.

Figure 4B:
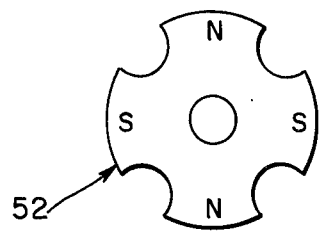
Figure 5B:
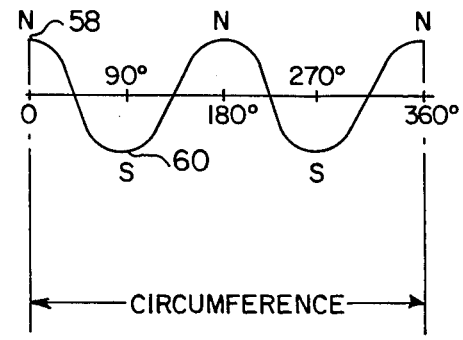

This is to be compared with the prior art rotor, constituting radially oriented magnets as diagrammatically illustrated in FIG. 4B and which is the subject matter of U.S. Pat. No. 3,068,373 discussed previously. The flux plot for the prior art rotor magnet (52) is shown in FIG. 5B. It will be noted in FIG. 4B that the magnets of the prior art rotor cover a wide angle at the poles and as a result the plot of FIG. 5B illustrates that the flux is distributed along this wide angle thereby diminishing its intensity and obscuring its sharpness when compared to the flux distribution of the present rotor.

As a result of the present invention, lock-in always occurs at the same position or at the next similar pole of a permanent magnet assembly, relative to a motor stator. Further, when compared with the prior art, no external electronic circuitry is necessary to obtain lock-in. It is to be noted that several motors, in accordance with the present invention, can be operated from the same rotor excitation supply. A final construction of the invention results in a simple, inexpensive and highly reliable unit.

It should be understood that the invention is not limited to the exact details of construction shown and described herein for obvious modifications will occur to persons skilled in the art.

We claim:

1. In a hysteresis synchronous motor having a centrally disposed shaft having a longitudinal axis and a stator coaxial with the shaft and a rotor assembly, said rotor assembly comprising:
   connecting means for mounting the rotor assembly on the shaft;
   first and second hysteresis rings coaxial with the shaft and mounted in axially spaced relationship to each other;
   a plurality of peripherally spaced coplanar juxtaposed arcuate-shaped permanent magnets located in radially spaced coaxial relation to the shaft and forming an annular assembly located between the rings, the magnets having similar poles positioned in confronting relation to form a flux distribution around the periphery of the rotor, the distribution characterized by sharp flux peaks in the vicinity of the confronting poles, together with a first and second non-magnetic spacing means located between first and second confronting surfaces of the magnets and axially spaced said first and second hysterisis rings disposed on either side thereof for limiting the magnetic shunting effect of the rings.

2. The structure set forth in claim 1 wherein the rings are comprised of stacked laminations fabricated from hysteresis material.

3. The structure set forth in claim 1 wherein the rings are comprised of solid hysteresis material.

4. A synchronous hysteresis motor comprising:
   an output shaft;
   a stator;
   a rotor connected to the shaft and comprising:
      first and second axially spaced hysteresis rings defining an axial space therebetween;
      a plurality of peripherally spaced coplanar arcuate permanent magnets positioned in juxtaposition said first and second hysteresis rings within the space;
      first and second non-magnetic spacers respectively interposed between the coplanar magnets and said first and second hysteresis rings for limiting the magnetic shunting effect of the rings.

5. The structure set forth in claim 4 wherein the magnets are positioned so that similar poles are located in confronting relation to each other to form a flux distribution around the periphery of the rotor, the distribution characterized by sharp flux peaks in the vicinity of the confronting poles.

6. The structure set forth in claim 5 wherein the rings are comprised of stacked laminations fabricated from hysteresis material.

7. The structure set forth in claim 5 wherein the rings are comprised of solid hysteresis material.

* * * * *